(No Model.)

J. W. TYGARD.
SPEED CHANGING GEAR FOR BICYCLES.

No. 537,622. Patented Apr. 16, 1895.

Witnesses
J. P. Evans
Wm Jackson

Inventor:
James Wallace Tygard

UNITED STATES PATENT OFFICE.

JAMES WALLACE TYGARD, OF PITTSBURG, PENNSYLVANIA, ASSIGNOR TO THE TYGARD-POLLMAN COMPANY, LIMITED, OF SAME PLACE.

SPEED-CHANGING GEAR FOR BICYCLES.

SPECIFICATION forming part of Letters Patent No. 537,622, dated April 16, 1895.

Application filed August 22, 1894. Serial No. 521,009. (No model.)

*To all whom it may concern:*

Be it known that I, JAMES WALLACE TYGARD, a citizen of the United States, residing at Pittsburg, in the county of Allegheny and State of Pennsylvania, have invented certain new and useful Improvements in Speed-Changing Gear for Bicycles and other Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved method for driving the wheels of the common bicycle, or other vehicles, and the objects of my improvement are, first, to increase the power of the rider's foot upon the pedal of a bicycle or other vehicle, instantly, without the rider stopping or dismounting from machine; second, to assist learners to ride the bicycle, as by using slow speed the machine is readily and steadily started; third, to increase the velocity of the machine, instantly, without stopping or dismounting; fourth, to reduce the size of the driving sprocket, and the length of driving chain required on a bicycle; fifth, to largely increase the utility of the machine, by adding very slightly to its parts and weight. I attain these objects by the mechanism illustrated in the accompanying drawings, in which—

Figure 1:
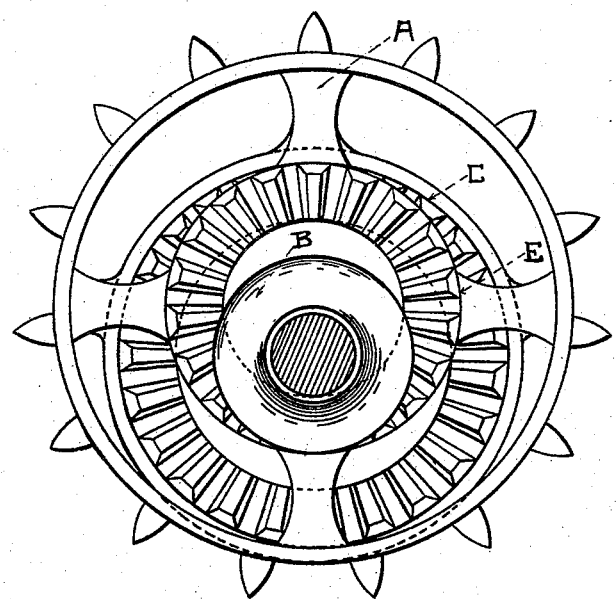
Figure 3:
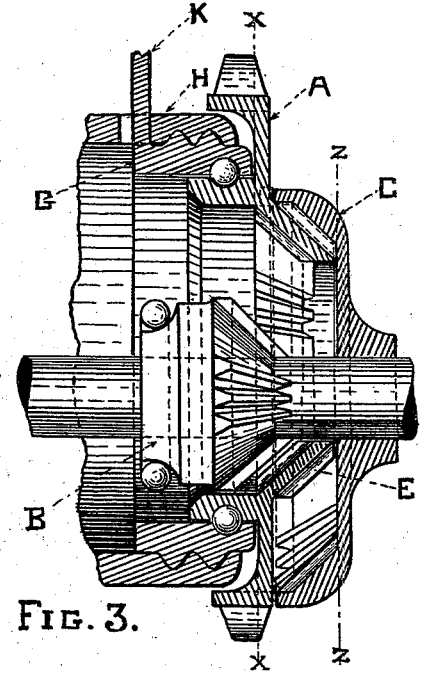
Figure 2:
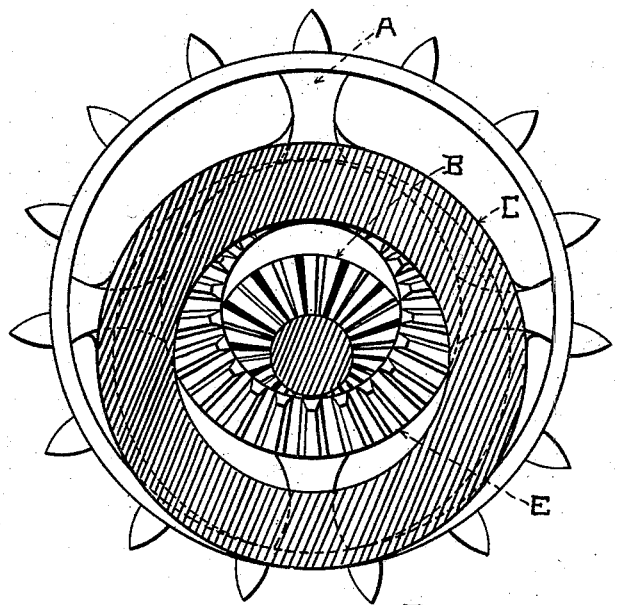

Figure 1 is a rear side view of the device as it appears with the ball bearing side of the sprocket hub removed at sectional line X, in Fig. 3. Fig. 2 is a front side view of device as it appears with the center and hub of driving wheel C removed at sectional line Z in Fig. 3. Fig. 3 is a vertical section of the entire device as applied to the driving shaft of the common safety bicycle.

Similar letters refer to similar parts throughout the several views.

To the driving shaft of the bicycle or other vehicle is attached a wheel C, containing in its rim an internal bevel gear. A short distance from this wheel and on same shaft is fastened an external bevel gear B, with face opposite the larger internal bevel gear. The rear side of this gear B is formed with a circular curve near its junction with the shaft thus forming one of the cones for the ball bearing of the driving shaft. This gear B is of a proportionately smaller diameter than the bevel gear C to produce desired difference in speed. These two gears on the same shaft constitute the mechanism that drives the sprocket wheel A, when my device is used on the crank shaft of the common safety bicycle. When the device is used upon the rear wheel of the bicycle these gears become the driven instead of drivers. Working in the gear of this internal bevel wheel C is a sprocket wheel A on one end of whose hub is formed an external and an internal bevel gear face. The outside of the other end of wheel A's hub is formed to constitute part of the ball bearing on which it revolves. The pitch diameters of the external and internal bevel gears formed on this hub are preferably made the same.

The outer face of wheel A may be either a cogged surface, a sprocket for chain as shown; a pulley face for belt or rope, or may have spokes and rim adapted to road locomotion. This wheel A with a double gear on its hub, revolves in an independent and parallel bearing from that in which the driving shaft carrying the gear wheels B and C revolve. This bearing is formed on one end of a double coarse threaded sleeve G H seen in section in Fig. 3, and preferably I use the ordinary ball bearing. The other end of the stationary part of this sleeve is firmly attached to the frame of the machine. Upon the inner end of the movable part of this sleeve G is formed an actuating arm K Fig. 3, which upon being rotated to the right causes the movable part of this sleeve to partly revolve, thus carrying its outer end forward endwise, and causing the sprocket wheel A on its outer end to move endwise and the external teeth on its hub E to mesh into and engage the internal bevel gear in the rim of driver wheel C at the same time disengaging the internal gear at E from gear B. The device will then cause the sprocket wheel A to revolve at a fast speed and driver wheel C having a larger pitch diameter than the external bevel gear on the sprocket hub at E, a smaller sprocket wheel may be used, than is at present the case. By rotating the arm K to the left or opposite direction this wheel A is withdrawn from mesh with wheel C and farther movement causes the internal bevel gear on the hub of sprocket wheel A at E to engage in the teeth of the smaller external gear B on driving shaft. The sprocket wheel A is then driven at slow speed and the power of the rider's foot upon the pedal either in propelling the machine, or in retarding pedal motion in descending grades is proportionately increased. Either of these changes may be made instantly and while riding at any speed, without dismounting.

The sleeve arm K may be moved by hand direct or may be actuated from the handles of the machine by the ordinary brake lever which it renders unnecessary to use for the brake.

It will readily be seen this device will work equally satisfactory should the driving gears be moved endwise instead of the driven wheel as shown.

In the foregoing specification and drawings I have used the terms "bevel internal" and "external gears." However my invention will also work with other than bevel gears, crown or face gears and straight or spur gears may be employed. I preferably use the bevel tooth because it requires the least amount of lateral motion for its withdrawal from mesh in changing the gear from fast to slow. It will readily be seen that a beveled or sharp pointed tooth will more readily enter into engagement when moved laterally than a spur gear or face gear tooth. The bevel gear I prefer to use has a little more clearance or space at the pitch line than is common in an external bevel gear wheel.

I am aware that prior to my invention bevel internal and external gears were used to gain power. I therefore do not claim such a combination broadly.

I am also aware that ball bearings are not novel and I do not claim them as my invention broadly, but What I do claim, and desire to secure by Letters Patent, is—

1. The combination in a bicycle or other vehicle of an internal and external gear, carrying sprocket teeth on its exterior, revolving on an independent bearing, laterally movable, in which gear revolves an internal and external gear, whose bearings are stationary, and which gears are caused to engage and disengage from mesh with each other, by the rotation of a double sleeve, one part of which is movable and carries on one end the laterally movable bearing and sprocket gear: and the other part of which sleeve is fastened to the frame of the machine, the parts of which double sleeve are screwed or threaded together the movable part into the stationary part, substantially as set forth.

2. In a bicycle or other vehicle the combination of two sets of internal and external bevel gears on parallel though independent bearings; and a double sleeve, threaded, and carrying one of the bearings for one of the sets of internal and external bevel gears, and by the rotation of the movable part of which double sleeve upon the stationary part the sleeve is screwed or unscrewed carrying the movable part of the sleeve laterally, and causing the double sets of internal and external bevel gears one set of which gears are formed on the hub of the sprocket wheel to engage and disengage from mesh with each other substantially as set forth.

3. A bicycle or other vehicle having a fixed bearing for driving shaft combined with a double sleeve, placed over or above the fixed bearing, one half of this sleeve attached to frame; the other half screwed into the fixed part and carrying a bearing at its outer end and an actuating lever on its inner end, which projects through an opening in the fixed part of sleeve and by the rotation of which lever the sleeve and bearing is moved laterally; a sprocket wheel, having an internal and an external bevel gear formed on its hub and its bearing on the outer end of the double sleeve; together with a driving shaft whose fixed bearing is under the double sleeve and runs through the center of the sprocket gear having keyed thereon an internal gear and an external gear; said gears being adapted to mesh with the gears carried by the sprocket gear, all substantially as, and for the purpose described.

4. The combination in a bicycle or other vehicle of an internal and an external gear, carrying sprocket teeth on its exterior, revolving on an independent bearing laterally movable, in the center of which sprocket gear revolves a shaft having keyed thereon an internal gear and an external gear, said gears being adapted to mesh with the gears carried by the sprocket gear, and which double set of gears are caused to engage and disengage from mesh with each other by the rotation of a double sleeve, one part of which is movable, and carries on one end the laterally movable bearing and sprocket gear and on the other end an actuating lever and which part of sleeve is screwed or threaded into the stationary part of the sleeve fastened to frame of machine, all substantially, and for the purpose described.

In testimony whereof I affix my signature in presence of two witnesses.

JAMES WALLACE TYGARD.

Witnesses:
J. B. SHERMAN,
W. WHITE.